United States Patent Office 2,820,038
Patented Jan. 14, 1958

2,820,038

2-DIPHENYL-METHYL-PIPERIDINE

Karl Hoffmann and Jules Heer, Binningen, Ernst Sury, Basel, and Ernst Urech, Binningen, Switzerland, assignors to Ciba Pharmaceutical Products, Inc., Summit, N. J.

No Drawing. Application June 11, 1954
Serial No. 436,226

Claims priority, application Switzerland July 6, 1953

3 Claims. (Cl. 260—293)

This invention is for the manufacture of 2-diphenyl-methyl-piperidine of the formula

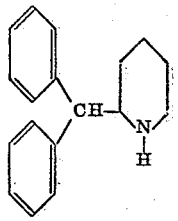

and salts thereof.

This new piperidine compound shows a stimulating effect on the central nervous system which is exhibited by an increase of spontaneous motor activity. In addition, it shows a rather strong narcoleptic effect, and might be used as a psychomotor stimulant or a narcoleptic.

Among the isomeric diphenyl-piperidyl-methane compounds, the 4-diphenylmethyl-piperidine has already been described (Journal für praktische Chemie, vol. 153, page 257 (1939)), and also the correspondingly substituted carbinols, such as diphenyl-piperidyl-(2)-carbinol (U. S. Patent No. 2,624,739). These compounds have also a stimulating effect on the central nervous system, but their effect is considerably slighter. The new 2-diphenylmethyl-piperidine is as much as 100 times more effective than the isomeric 4-diphenylmethyl-piperidine. Surprising is more especially the finding that the mentioned diphenylpiperidyl-methane and diphenylpiperidyl-carbinol compounds have no narcoleptic effect. This particular property is peculiar only to the diphenylmethyl-piperidine of the present invention.

The new piperidine is obtained by heating the 2-diphenylmethyl-pyridine with a hydrogenating agent.

The hydrogenation can be carried out with those agents which are known for the hydrogenation of a pyridine ring. For example, hydrogenation may be carried out with hydrogen in the presence of a catalyst, advantageously a precious metal catalyst, such as platinum, and in the presence of nickel or copper chromite. The 2-diphenyl-methyl-pyridine can also be used in the form of its salts.

Depending on the procedure used, the new compound is obtained in the form of its base or salts. From the salts the base can be obtained by methods in themselves known. From the latter, salts can be made by reaction with an acid suitable for the formation of therapeutically useful salts such, for example, as hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid or a therapeutically active acid.

The following examples illustrate the invention, the parts being by weight unless otherwise stated and the relationship of parts by weight to parts by volume being the same as that of the gram to the cubic centimeter:

Example 1

36.75 parts of 2-diphenylmethyl-pyridine, dissolved in 150 parts by volume of glacial acetic acid, are agitated with 1 part of platinum oxide as catalyst at 40–45° C. in an atmosphere of hydrogen until hydrogen is no longer absorbed. The glacial acetic acid is evaporated in vacuo, the residue is rendered alkaline with concentrated caustic soda solution, and the oil which separates is taken up in ether. After washing and drying the ethereal extract, the solvent is evaporated, the residue is dissolved in a small amount of absolute ethyl acetate and mixed with an excess of hydrogen chloride dissolved in ethyl acetate. The resulting hydrochloride of 2-diphenylmethyl-piperidine of the formula

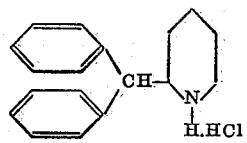

obtained in a state of high purity, is recrystallized from a mixture of methanol and ethyl acetate, and then melts at 286–287° C. (with decomposition).

The starting material mentioned above may be prepared as follows:

193 parts of diphenyl-acetonitrile are heated in a stirring vessel with 60 parts of pulverized sodamide in 500 parts by volume of absolute toluene for 1½ to 2 hours at 120–130° C. The contents of the flask are then cooled to 70° C., and 238 parts of 2-bromopyridine are introduced dropwise. The exothermic reaction is so controlled by cooling that the temperature does not exceed 85° C. After the addition of the bromopyridine the reaction mixture is heated for a further 3 hours at 120–130° C. After cooling, there are cautiously added dropwise, while cooling with ice, first 50 parts by volume of methanol and then 200 parts by volume of water, and then the basic constituents are taken up with hydrochloric acid of 20 percent strength. The acid extract is rendered alkaline with caustic soda solution of 40 percent strength, the resulting crystalline precipitate is filtered off with suction, washed with a large quantity of water, dried on the filter, and recrystallized from methanol. In this manner there are obtained 208 parts of diphenyl-pyridyl-(2)-acetonitrile melting at 123–125° C.

208 parts of diphenyl-pyridyl-(2)-acetonitrile, 1000 parts by volume of methanol, 224 parts of potassium hydroxide and 335 parts by volume of water are heated for 10 hours in an autoclave at 215–225° C. After cooling the mixture, the excess of methanol is evaporated, the residue is extracted with ether, the ethereal extract is washed with water and dried over sodium sulfate. After distilling the solvent the residue is distilled in a high vacuum, 2-diphenylmethyl-pyridine passing over at 157–159° C. under 0.025 mm. pressure. It solidifies in crystalline form immediately and melts at 60–61° C.

Example 2

24.5 parts of 2-diphenylmethyl-pyridine dissolved in 225 parts by volume or absolute alcohol are agitated with 6 parts of Rupe nickel (or Raney nickel) at 115° C. in an atmosphere of hydrogen at an initial pressure of 100 atmospheres. When hydrogenation is complete, the catalyst is removed by filtration, the solvent evaporated and the residue distilled in high vacuum. The 2-diphenyl-methyl-piperidine of the formula

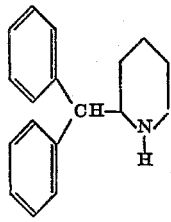

boils at 151–153° C. under 0.005 mm. pressure of mercury and forms a hydrochloride which melts at 286–286.5° C. (from a mixture of methanol and ether) and is identical with the product of Example 1.

The new compound can be used as a medicament, for example, in the form of pharmaceutical preparations which contain it in admixture with a pharmaceutical organic or inorganic carried material suitable for enteral or parenteral application. For the production of these preparations such substances are concerned as do not react with the new compounds, so for example water, gelatine, lactose, starch, magnesium stearate, talc, vegetable oils, benzyl alcohols, gums, polyalkylene glycols, Vaseline, chloesterol, or other known medicament carriers. The pharmaceutical preparations can take the form of, for example, tablets, dragees, salves, creams, or are in liquid form as solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are obtained by the usual methods. For example the following preparations can be made:

| Tablets | 1.0 mg. | 5.0 mg. |
|---|---|---|
| 2-diphenylmethyl-piperidine _____mg__ | 1.0 | 5.0 |
| Talcum_____mg__ | 5.7 | 3.7 |
| Lactose_____mg__ | 52.0 | 50.0 |
| Gelatine_____mg__ | 1.0 | 1.0 |
| Wheat starch_____mg__ | 30.0 | 30.0 |
| Arrowroot_____mg__ | 10.0 | 10.0 |
| Magnesium stearate_____mg__ | 0.3 | 0.3 |
| Total_____mg__ | 100.0 | 100.0 |

Ampules: Mg.
2-diphenylmethyl-piperidine _____ 2.0
Sodium chloride _____ 15.0
Secondary sodium phosphate _____ 2.0
Primary sodium phosphate _____ 4.0
Distilled water to make up 2.0 cc.

What we claim is:
1. 2-diphenylmethyl-piperidine.
2. A member selected from the group consisting of 2-diphenylmethyl-piperidine and non-toxic salts thereof.
3. The hydrochloride of 2-diphenylmethyl-piperidine.

References Cited in the file of this patent

UNITED STATES PATENTS

| | | |
|---|---|---|
| 2,599,365 | Berger | June 3, 1952 |
| 2,636,881 | Schultz | Apr. 28, 1953 |
| 2,739,968 | Sperber | Mar. 27, 1956 |
| 2,739,969 | Sperber | Mar. 27, 1956 |

OTHER REFERENCES

Piantanida: Jour. für practische Chemie, vol. 153, pp. 257–262 (1939).

U. S. DEPARTMENT OF COMMERCE
PATENT OFFICE

CERTIFICATE OF CORRECTION

Patent No. 2,820,038　　　　　　　　　　　　　　　　　January 14, 1958

Karl Hoffmann, et al.

It is hereby certified that error appears in the printed specification of the above numbered patent requiring correction and that the said Letters Patent should read as corrected below.

Column 2, line 68, for "volume or absolute" read -- volume of absolute --; column 3, line 19, for "carried material" read -- carrier material --; line 25, for "chloesterol" read -- cholesterol --.

Signed and sealed this 20th day of May 1958.

(SEAL)

Attest:

KARL H. AXLINE　　　　　　　　　　　　　　　　　　　ROBERT C. WATSON
Attesting Officer　　　　　　　　　　　　　　　　　　Commissioner of Patents